March 5, 1935.  F. A. GILL  1,993,213
SOLAR RAY APPARATUS
Filed Oct. 18, 1933
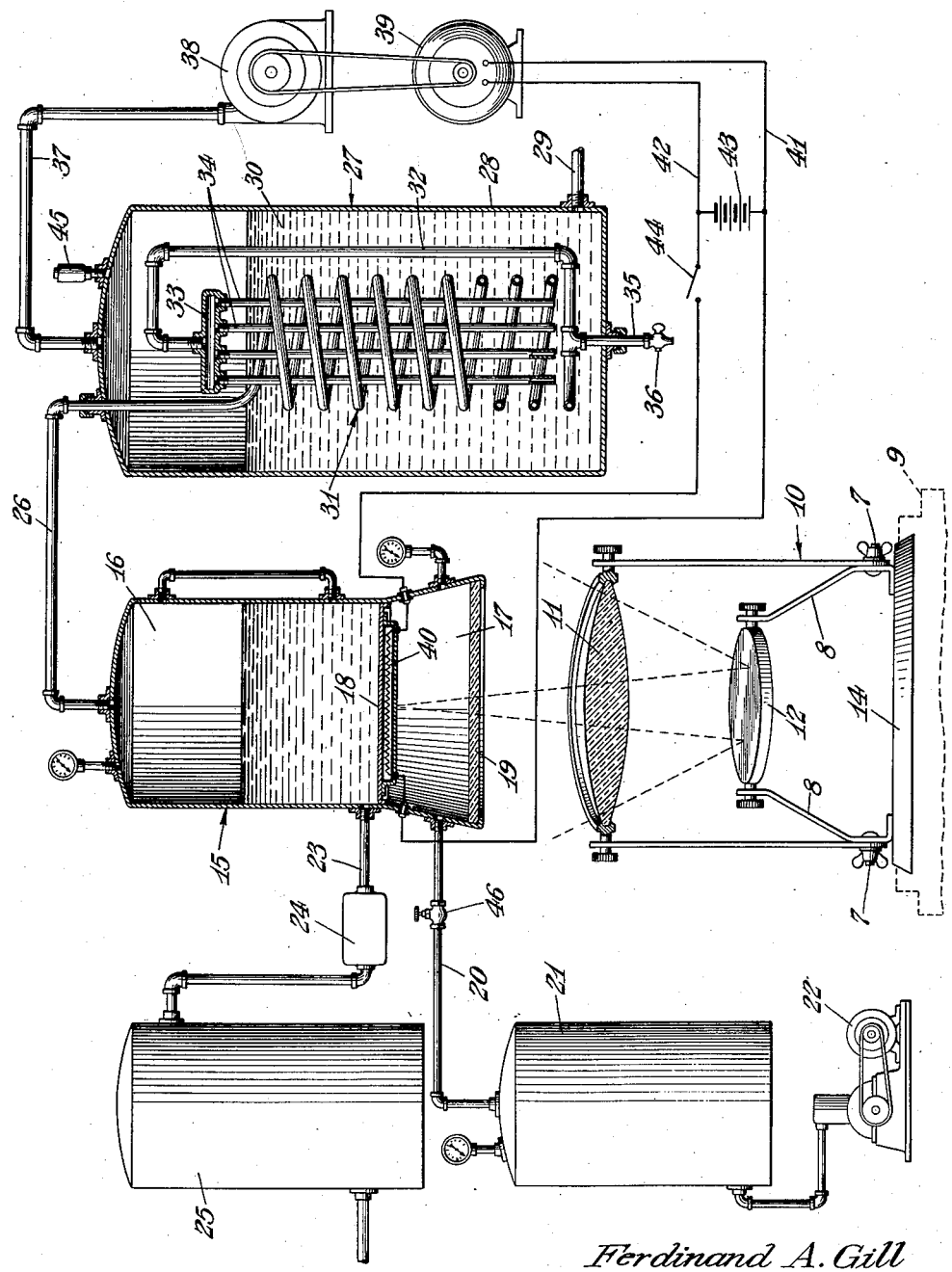
Ferdinand A. Gill
Inventor
His Attorneys Patented Mar. 5, 1935

1,993,213

UNITED STATES PATENT OFFICE 1,993,213

SOLAR RAY APPARATUS

Ferdinand A. Gill, Chicago, Ill.

Application October 18, 1933, Serial No. 694,051

2 Claims. (Cl. 126—271)

This invention relates to solar ray apparatuses.

It is an object of this invention to provide an improved solar ray apparatus which is relatively simple and inexpensive in construction and efficient in use.

Other objects of the invention are: to provide an improved vapor generator for converting the energy of the collected solar rays into energy in the form of vapor or steam pressure; and to provide the combination hereinafter described and claimed.

Other objects will appear hereinafter.

The invention consists in the novel combination and arrangement of parts to be hereinafter described and claimed.

The invention will be best understood by reference to the accompanying drawing, showing the preferred form of construction and in which:

The single figure, partly in section and partly in elevation, shows a preferred form of the new apparatus and therein a solar ray collecting and reflecting device is generally indicated at 10. This solar ray collecting and reflecting device 10 comprises a suitable convex ray collecting lens 11 and a suitable ray reflector 12, both carried by a base 14 adjustable or rotatable in a horizontal plane upon a support 9 so as to accommodate the lens 11 and the reflector 12 to the declination of the sun and the various angles at which the sun's rays strike the ray-collecting lens 11. Further to affect the adjustment of the lens 11 and reflector 12, the reflector 12 is mounted on a bracket 8 which is carried by, and which is stationary relative to, the base 14 while the lens 11 is adjustably mounted upon the frame 13 which in turn is pivotally mounted upon the bracket 8, as at 7, for movement in a vertical plane.

Arranged above the solar ray collecting device 10 and supported in any suitable manner is a vapor pressure generator unit which is generally indicated at 15. This vapor generator unit 15 comprises a boiler compartment 16 and a compressed air compartment 17, these compartments being separated by a flexible heat-conductive diaphragm or wall 18 which is preferably in the form of a sheet of flexible copper, this being the preferred metal because of its high heat conductive capacity. A transparent wall 19, preferably made of quartz, forms the bottom of the compressed air compartment 17; this wall 19 being positioned to have the solar rays reflected from the reflector 12 directed therethrough.

Communicating with the compressed air compartment 17 of the vapor generator unit 15 is a conduit 20 which leads to a compressed air accumulator or pressure storage tank 21 that has associated therewith an air compressor 22 of conventional design.

Communicating with the boiler compartment 16 of the vapor generator unit 15 is a fluid inlet 23 which leads, through an automatic cut-off valve 24 of conventional design, to a fluid storage tank 25. The fluid storage tank 25 in turn communicates with a suitable source of fluid under pressure such, for example, as a municipal water supply.

Leading from the boiler compartment 16 of the vapor generator unit 15 is a conduit 26 which leads into a second vapor pressure generator unit 27. This auxiliary vapor generator unit 27 comprises a boiler 28, which may be of any desired design and shape. This boiler 28 has an inlet 29 through which a suitable fluid such, for example, as water may be introduced, and is also provided with a safety valve 45.

Arranged in the vapor generator or boiler 28 and surrounded by the fluid 30 is a coiled tube 31, the uppermost convolution of which communicates with the conduit 26 and the lowermost convolution of which opens into a vertical pipe or conduit 32 which is arranged within the boiler 28. This conduit 32 opens at its upper end into a distributor head 33. Extending from the distributor head 33 through the coil 31 is a series of parallel injector tubes 34 which open at their lower ends into the fluid 30 in the boiler 28; a condensate drain 35 leading from the lowermost convolution of the coil 31 out of the boiler 28. This drain 35 is controlled by a valve 36 which is arranged externally of the boiler 28.

A conduit 37 leads from the top of the boiler 28 to a conventional prime mover which may be a fluid pressure operated turbine 38. This prime mover 38 may be utilized in any manner to do work as by operating an electric generator 39 of conventional design.

Arranged in the compressed air compartment 17 and suitably electrically insulated therein is an electric heating element 40 which is electrically connected to the generator 39 by way of conductors 41 and 42; a storage battery or accumulator 43 being electrically connected to the generator 39 and to the heating element 40 and a control switch 44 being arranged in one of the conductors 42.

Operation

The solar rays collected by the lens 11 are directed by the reflector 12 through the transparent wall 19 of the vapor generating unit 15 and thence against the flexible metal bottom wall or diaphragm 18 of the boiler compartment 16 thereby heating the fluid in the compartment 16 to convert the same into vapor. This vapor under the pressure caused by its own accumulation in the boiler compartment 16 passes through the conduit 26 into the coil 31 through which it circulates thereby heating the water or other fluid 30 in the boiler 28 of the auxiliary generator 27. After passing from the coil 31 the steam or other heated vapor enters the conduit 32, passes into the distributor 33, and thence into the injector tubes 34 from which it is ejected into the fluid 30 and to convert the same into a vapor. The vapor formed in the auxiliary vapor generator 28 passes through the conduit 37 to the turbine or other prime mover 38 which operates the generator 39. Part or all of the electric energy output of the generator 39 may be utilized in any desired manner but a part, at least, of the output of the generator 39 is preferably directed to the storage battery or accumulator 43 from which it may be drawn, as desired, by closing the switch 44, to heat the electric heating element 40 so as to continue the operation of the apparatus when the solar rays are not available as at night and on cloudy days.

Some of the steam or other vapor passing through the coil 31 will be condensed before passing into the conduit 32 and this condensate may be drained from the coil 31 as desired by opening the drain valve 36.

It will be noted that in the present apparatus the reflected solar rays do not directly strike the bottom wall 18 of the vapor generator or boiler 15 but first pass through the transparent quartz wall 19 which forms the bottom of the compressed air compartment 17. In addition to functioning as the bottom wall of the compressed air compartment 17 the transparent quartz wall 19 also cooperates with the lens 11 and reflector 12 as a part of the solar ray-collecting and reflecting apparatus to focus the collected rays upon the heat-conductive flexible copper diaphragm 18, which, because of its high heat-conductive property, readily transfers its heat to the water in the boiler compartment 16 to generate vapor therein.

As the vapor pressure in the boiler compartment 16 of the vapor generator 15 increases the flexible metal bottom or diaphragm 18 yields slightly and flexes downwardly, thereby slightly enlarging the cubic volume of the vapor generator compartment or boiler 16. This vapor pressure on the flexible diaphragm 18 is, however, offset or neutralized by the pressure of the compressed air in the compartment 17. This arrangement is made necessary because of the fact that while the side walls and top of the boiler compartment 16 are made of relatively heavy boiler plate metal which is capable of resisting the maximum vapor pressure allowable in the boiler compartment 16, the bottom wall of the boiler compartment 16, being made of a relatively thin, flexible metal diaphragm 18 is incapable, by itself, of resisting the vapor pressure in the boiler compartment 16 and must have an external, resilent support on its bottom side. The compressed air in the compartment admirably provides this external support for the metal diaphragm 18 and when once heated retains its heat for a considerable length of time.

It has been found by experiment that the preferred ratio between the cubic volumes of the boiler compartment 16 and the boiler 28 is approximately 1 to 10 and that the preferred cubic volume of the boiler compartment 16 is about 1 gallon since the volume of water can readily be heated by the sun's rays collected and reflected as set forth. However, the boiler 28 may be made larger and two or more coils 31 and associated parts be placed therein, which necessitates a like number of vapor generating units 15.

The flexible metal wall or diaphragm 18 may, if desired, be coated with any suitable heat-conductive substance to increase the heat-conductive or transferring properties of the diaphragm.

The air pressure in the compartment 17 must be regulated to correspond with pressure changes in the boiler compartment 16. This may be accomplished by conventional automatic control devices now in the market or it may be done manually as, for example, by manipulating the valve 46 which is arranged between the compressed air tank 21 and the boiler compartment 17.

It is to be noted that the flexible, heat-conductive copper metal diaphragm 18 is necessitated by the fact that a rigid, relatively heavy or thick metal plate cannot be used for the bottom of the boiler compartment 16 since it would not have the requisite high heat conductive property of the copper sheet readily to transfer heat from the compressed air compartment 17 to the boiler compartment 16.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A vapor generating unit, comprising: a housing including a boiler compartment and a compressed air compartment; a heat conductive flexible diaphragm arranged between and separating said compartments; and means for introducing air under pressure into said compressed air compartment.

2. A vapor generating unit, comprising: a housing including a boiler compartment and a compressed air compartment; a heat conductive flexible diaphragm arranged between and separating said compartments; said compressed air compartment having a transparent bottom wall adapted to be arranged in the path of solar rays; and means for introducing air under pressure into said compressed air compartment.

FERDINAND A. GILL.